United States Patent

[11] 3,593,453

[72] Inventors Gary R. Bishop
950 Ashbridge, Harbor City, Calif. 93030;
Kenneth H. Bishop, 4591 Don Felipe Drive,
Los Angeles, Calif. 90008
[21] Appl. No. 825,315
[22] Filed May 16, 1969
[45] Patented July 20, 1971

[54] HIGH-SPEED BAIT SLED
5 Claims, 4 Drawing Figs.
[52] U.S. Cl. .................................................. 43/55
[51] Int. Cl. ............................................ A01k 97/04
[50] Field of Search .......................................... 43/55, 56

[56] References Cited
UNITED STATES PATENTS
2,485,684 10/1949 Aldredge ..................... 43/55
2,657,496 11/1953 Spotswood .................... 43/55
2,966,002 12/1960 Hobson et al. ................. 43/55
3,304,645 2/1967 Hardesty et al. ............... 43/55
3,367,061 2/1968 Brandemihl et al. ............ 43/55

Primary Examiner—Aldrich F. Medbery
Assistant Examiner—Daniel J. Leach
Attorney—Beehler & Arant ABSTRACT: A water-borne device, such as a high-speed bait sled to be towed behind a motor-powered boat, having a chamber with a forwardly facing inlet below the waterline and an exposed outlet above the waterline arranged in a manner such that ram pressure at the inlet occasioned by motion of the device through the water induces waterflow into the chamber. The water emerges from the chamber through the exposed outlet to indicate water circulation through the chamber.

PATENTED JUL 20 1971

3,593,453

INVENTORS.
GARY R. BISHOP
KENNETH H. BISHOP

By Buehler & Grant
ATTORNEYS.

HIGH-SPEED BAIT SLED

BACKGROUND OF THE INVENTION

1. Field of the Invention

This invention relates generally to the field of waterborne devices having a chamber through which water is required to circulate during movement of the devices through the water. More particularly, the invention relates to novel means for inducing and indicating such circulation.

2. Prior Art

While the invention is susceptible of application of any waterborne device of the class described, its primary application is on a so-called high-speed bait sled. For this reason, the invention will be disclosed in connection with such a sled.

A bait sled is a bait container which is adapted to hold fishing bait, such as minnows and the like, and to be towed behind a high speed motor boat. To this end, the sled is provided with a generally boat shaped hull in order to reduce its resistance to high speed movement through the water. Within the hull is a chamber for receiving the bait. The hull has an upper access opening with a closure which may be opened to permit bait to be placed in and removed from the chamber. The hull has openings through which water may pass to maintain the chamber full of water.

The present bait sleds are quite satisfactory at rest and when towed at relatively slow speeds. However, these sleds suffer from the deficiency that at relatively high speeds, they tend to rise and cant in the water to such an extent that much of the water drains from the bait chamber. This has an adverse effect on the bait in the chamber.

SUMMARY OF THE INVENTION

The disclosed embodiment of the invention is a high-speed bait sled which avoids the above noted and other disadvantages of the existing sleds. To this end, the present sled is provided with a forwardly facing water inlet, such as a scoop, below the water line and an exposed outlet, such as an upwardly opening nozzle, above the waterline. When the bait sled is towed through the water, ram pressure at the submerged inlet causes waterflow through the inlet into the bait chamber. The water emerges from the chamber through the exposed outlet to indicate that water completely fills and is circulating through the chamber. Preferably, the sides of the sled are perforated to aid filling of the chamber when at rest.

The particular bait sled described in this disclosure is equipped with lateral hydrofoillike fins which cause the sled to rise high in the water and cant upwardly in the direction of the prow at high speeds. This reduces the water resistance of the sled and hence the drag which the sled exerts on its towing boat. The water scoop is located at the stern of the sled and the water outlet adjacent the prow. This is to assure proper action of the water circulation means at all speeds, particularly at high speeds when the bottom of the sled may ride along the water surface.

DESCRIPTION OF THE PREFERRED EMBODIMENT

Turning now to these drawings, there is illustrated a waterborne device 10 embodying the invention. In this instance, the waterborne device is a fishing bait container of the class which is adapted to be towed at relatively high speed behind a motor driven boat 12. A bait container of this type is commonly referred to as a high-speed bait sled and is utilized to contain a large supply of fishing bait, such as minnows.

Figure 2:
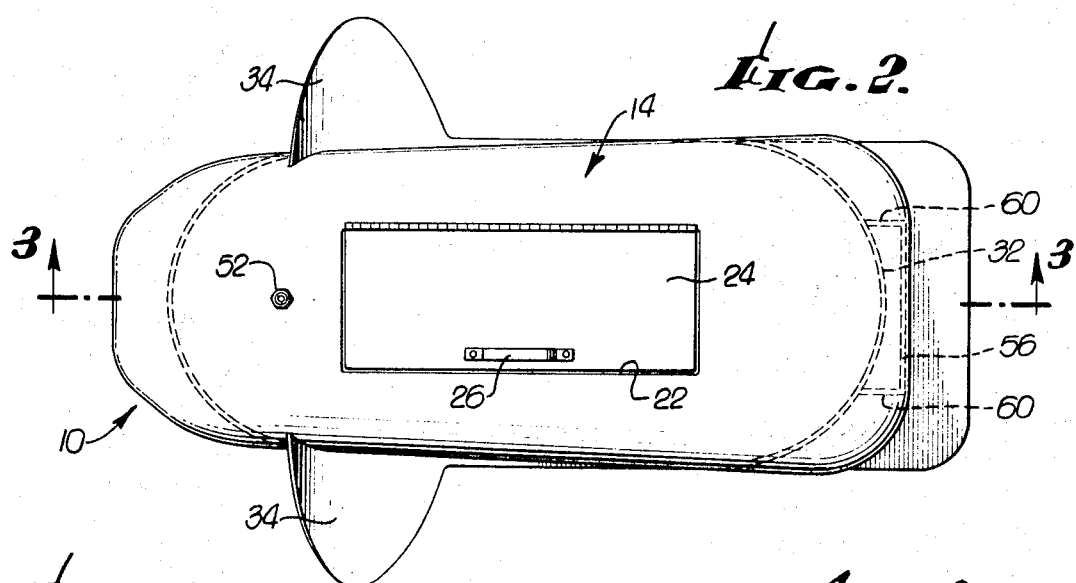
FIG. 2 is an enlarged top plan view of the bait sled.
Figure 3:
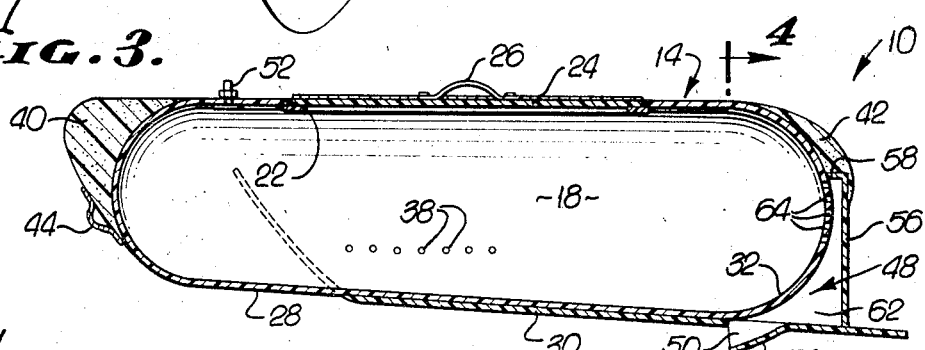
FIG. 3 is a section taken on line 3–3 in FIG. 2.
Figure 4:
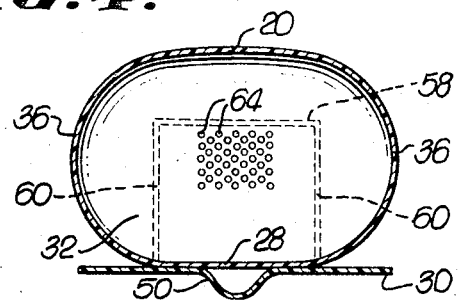
FIG. 4 is a section taken on line 4–4 in FIG. 3.

The high-speed bait sled 10 has a hollow, generally boat-shaped hull 14 containing a chamber 18 for holding the bait. The illustrated hull 14 is elongated longitudinally and has rounded prow and stern end walls, as shown in FIGS. 2 and 3, and has a generally ellipsoidal shape in transverse cross section, as shown in FIG. 4. Also as shown in FIG. 3, the hull tapers slightly in the fore and aft direction. The upper wall 20 of the hull has an access opening 22 containing a hinged closure or door 24. This door has a handle 26 by which the door may be opened to provide access to the bait chamber 18. If desired, suitable locking means may be provided for locking the door in its closed position.

Attached to the bottom wall 28 of the hull is a plate 30. The rear end of this plate extends rearwardly of the curved stern wall 32 of the hull. The front end of the plate 30 is shaped to provide wings or fins 34 which curve upwardly along opposite sides of the hull 14, adjacent its prow, and project laterally out from the hull. Between its fins 34 and aft end, the plate 30 is generally flat and projects laterally out from the centerline of the hull, in diverging relation to its rounded sidewalls 36, as shown in FIG. 4.

Figure 1:
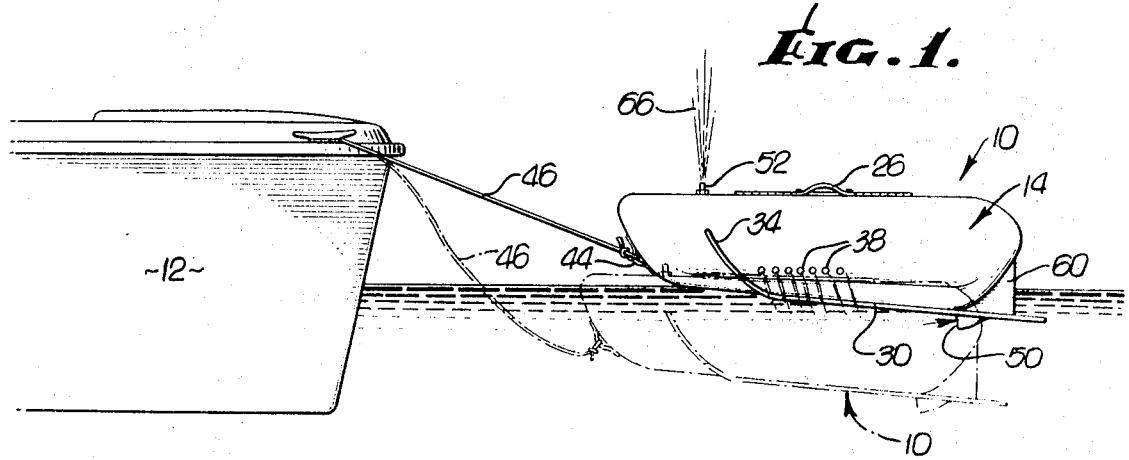
FIG. 1 is an elevational view illustrating a high-speed bait sled according to the invention being towed behind a motor powered boat and showing the sled in its at rest and high-speed positions within the water.

A high-speed bait sled, when at rest, is designed to float low in the water with its bait chamber almost totally flooded, as illustrated in broken lines in FIG. 1. To this end, the sidewalls 36 of the illustrated bait sled 10 are provided with ports 38 through which water may freely enter the bait chamber 18 to flood the latter. The bait sled is constructed of sheet metal, such that the sled tends to sink when its chamber is thus flooded. Accordingly, the sled must be equipped with suitable buoyancy means for providing the sled with just the right buoyancy to float low in the water as shown in broken lines in FIG. 1. In the particular embodiment of the invention which has been selected for illustration, these buoyancy means comprise floats 40 and 42 of buoyant material secured to the prow and stern, respectively, of the bait sled hull 14. The bow and stern floats may be constructed from any suitable buoyant material, one typical material being foam plastic. The bow float 40 has a rounded surface which conforms to and is adhesively bonded or otherwise secured to the rounded prow wall of the bait sled hull 14. The stern float 42 has a surface which conforms to and is adhesively bonded or otherwise secured to the rounded stern wall 32 of the hull. As may be best observed in FIG. 3, the bow float 40 has a somewhat larger displacement volume than the stern float 42. Moreover, the vertical extent of the bow float 40 is substantially greater than that of the stern float 42, and the bottom margin of the stern float is located well above that of the bow float. The bow and stern floats are arranged in such a way that the bait sled 10, when at rest in the water, floats in its submerged broken line position of FIG. 1, wherein the top wall 20 of the sled hull 14 is just slightly above and generally parallel to water level.

Referring to FIGS. 1 and 3 it will be observed that the front surface of the bow float 40 slopes rearwardly in a downward direction. Attached to this front surface of the float is a bracket 44 to which may be secured one end of a towline 46. The opposite end of the towline is attached to the towing boat 12. This towline serves two purposes. First, it anchors the bait sled to the boat, when at rest. Secondly, it serves to pull the bait sled behind the boat when the latter is in motion. During such motion, the lower bait sled plate 30, and particularly its bow wings or fins 34, act as a hydrofoil which causes the boat to rise in the water as the speed is increased, as shown in full lines in FIG. 1. This reduces the water resistance of the bait sled hull 14 and, thereby the drag exerted by the bait sled on the towing boat 12. Referring to FIG. 1, it will be observed that when the bait sled thus rises in the water during high speed motion, water tends to drain from the bait chamber 18. As noted earlier, this constitutes a disadvantage of the existing high-speed bait sleds, in that draining of their bait chambers while in motion has an adverse effect on the fishing bait within the chamber.

According to the present invention, the bait sled 10 is equipped with novel means 48 for maintaining the bait chamber 18 full of water, as well as maintaining of a constant circulation of water through the chamber, while the bait sled is in high speed motion. This water circulating means is also uniquely designed to indicate to the fisherman that water completely fills and is circulating through the bait chamber. To this end, the water circulating-indicating means 48 includes a forwardly facing water inlet 50 to the bait chamber 18 located below the lowest waterline of the bait sled hull 14, when the latter is in high-speed motion, and an upper exposed outlet 52 from the chamber. During high speed motion of the bait sled 10 through the water, ram pressure at the submerged inlet 50 induces waterflow into the bait chamber 18. A portion of this water emerges through the chamber outlet 52 to indicate to the fisherman that water completely fills and is circulating through the bait chamber, as just mentioned. In the particular embodiment of the invention selected for illustration, the submerged water inlet 50 is defined by a portion of the lower hull plate 30 which is offset downwardly from the plane of the plate to form a scoop 54. Joined to and rising from the plate 30, a short distance to the rear of the scoop 54, is a wall member 56. Along the upper edge of this wall member is a forwardly directed flange 58 which joins to the stern wall 32 of the bait sled hull 14, just below the stern float 42. Along the vertical edges of the plate 56 are flanges 60 which also join to the stern wall 32. From this description, it is evident that the plate 30, the stern wall 32, and the plate 56 effectively define an inlet water passage 62 communicating with the scoop inlet 50. The stern wall 32 is perforated to provide ports 64 which also communicate with the water passage 62. Thus, during high-speed motion of the bait sled, water enters through the submerged scoop inlet 50 and flows through the water passage 62 and the stern wall ports 64 into the bait chamber 18.

The illustrated outlet 52 from the bait chamber 18 comprises a nozzle mounted in the upper wall 20 of the bait sled hull 14. This nozzle is located adjacent the prow of the hull, along its longitudinal centerline, and opens upwardly. During high-speed motion of the bait sled, water is expelled through the nozzle 52 in the form of a jet 66, shown in FIG. 1, which is clearly visible from the boat 12. This water jet, then, provides a continuous indication to the fisherman that the bait chamber 18 is filled with water and that water is circulating through the chamber during high-speed motion of the bait sled, as mentioned earlier. It is evident, of course, that some of the water entering the bait chamber 18 during high-speed motion emerges from the chamber through the side ports 38. The bait sled is designed in such a way that during high-speed motion of the sled, the water enters the inlet 50 at a sufficient flow rate to maintain the bait chamber 18 full of water, with water emerging from the chamber through the lateral outlets 38 and the top discharge nozzle 52. In this connection, it will be understood that the force for inducing waterflow into the inlet 50 during high-speed motion is ram pressure of the water at the inlet occasioned by high-speed motion of the bait sled through the water.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

Having described the invention, what We claim as new in support of Letters Patent is:

1. Means for inducing and indicating circulation of water through a chamber within a waterborne bait sled being towed along the water surface behind a motor powered boat, said bait sled having a generally boat-shaped hull which rises and inclines upwardly in the direction of its prow as the velocity increases, said means comprising:
 a scoop on and protruding below the bottom of said hull adjacent the stern thereof, said scoop defining a water inlet to said chamber during motion of the bait sled through the water and facing in the direction of said motion, whereby said motion creates a ram pressure for inducing waterflow into said chamber, and
 an upwardly opening nozzle on the top of said hull adjacent its prow, said nozzle defining a water outlet from said chamber through which water emerges from said chamber to indicate that water fills and is circulating through said chamber.

2. Means for inducing and indicating circulation of water through a chamber within a waterborne device moving along the water surface, said means comprising:
 inlet means on said device defining a water inlet to said chamber located below the lowest water line of the device during motion of the latter through the water and facing in the direction of the motion, whereby said motion creates a ram pressure for inducing waterflow into said chamber, and
 outlet means on said device defining a water outlet from said chamber located above said waterline through which water emerges from said chamber to indicate water circulation through said chamber,
 wherein said device is a bait container to be towed behind a motor-powered boat, and
 said bait container is a high-speed bait sled having a generally boat-shaped hull which rises and inclines upwardly in the direction of its prow as the velocity increases,
 said inlet means comprises a scoop on and protruding below the bottom of said hull adjacent the stern thereof,
 said outlet means comprise an upwardly opening nozzle on the top of said hull adjacent its prow, and
 said hull includes means at its stern defining an inlet passage communicating said scoop and chamber, said passage extending upwardly from said scoop and then forwardly to said chamber.

3. A high-speed bait sled comprising:
 a generally boat-shaped hull having a bow and a stern and containing a bait chamber with atop access opening, and a cover for said access opening, and a cover for sad access opening,
 means at the bow of said hull for attaching a tow line to the hull,
 inlet means on said hull defining a water inlet to said chamber located below the lowest water line of the hull during motion of the latter through the water and facing in the direction of said motion, whereby said motion creates a ram pressure for inducing waterflow into said chamber, and
 outlet means located on the top of said hull defining a water outlet from said chamber through which water emerges from said chamber to indicate that water completely fills and circulates through said chamber.

4. A high-speed bait sled according to claim 3 including:
ports in the sidewall of said hull below said waterline.

5. A high-speed bait sled according to claim 4 wherein:
 said inlet means comprises a scoop mounted on and protruding below the bottom of said hull adjacent the stern thereof, and
 said outlet means comprises an upwardly opening nozzle on the top of said hull adjacent the bow thereof.